(12) United States Patent
Taketomi

(10) Patent No.: US 7,039,314 B2
(45) Date of Patent: May 2, 2006

(54) COMMUNICATION SYSTEM

(75) Inventor: Hisashi Taketomi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 648 days.

(21) Appl. No.: 09/878,199

(22) Filed: Jun. 12, 2001

(65) Prior Publication Data

US 2002/0101635 A1   Aug. 1, 2002

(30) Foreign Application Priority Data

Feb. 1, 2001   (JP)   ............................ 2001-025997

(51) Int. Cl.
*H04B 10/00*   (2006.01)
(52) U.S. Cl. .......................................... 398/30; 398/31
(58) Field of Classification Search .................. 398/16, 398/30, 31, 33, 37, 76, 79; 359/333, 349, 359/337.12, 337–337.9; 370/246, 247; 379/32.01; 340/3.1

See application file for complete search history.

(56) References Cited

U.S. PATENT DOCUMENTS

| | | | | |
|---|---|---|---|---|
| 6,018,406 A | * | 1/2000 | Ishimatsu et al. ............ | 398/181 |
| 6,256,126 B1 | * | 7/2001 | Ogawa ............................ | 398/9 |
| 6,271,962 B1 | * | 8/2001 | Choi ........................ | 359/337.11 |
| 6,433,903 B1 | * | 8/2002 | Barry et al. ................... | 398/79 |
| 6,639,701 B1 | * | 10/2003 | Hirst .............................. | 398/5 |

* cited by examiner

*Primary Examiner*—Agustin Bello
(74) *Attorney, Agent, or Firm*—Staas & Halsey LLP

(57) ABSTRACT

A communication system performs WDM optical communications efficiently with variably set supervisory control channels. The communication system includes a supervisory control channel setting unit for variably setting supervisory control channels for supervising optical communications, said supervisory control channels including a first optical supervisory channel whose transmission band falls outside of the transmission band for main optical signals, and a second supervisory channel whose transmission band falls in an idle band in the transmission band for said main optical signals. The communication system also has a WDM transmitting unit for wavelength-multiplexing and -demultiplexing said supervisory control channels and said main optical signals. A setting information indicating unit indicates, to a WDM device, setting information for setting the supervisory control channels. An operating state managing unit manages a network operating state.

11 Claims, 10 Drawing Sheets

COMMUNICATION SYSTEM

BACKGROUND OF THE INVENTION (1) Field of the Invention

The present invention relates to a communication system, and more particularly to a communication system for performing WDM (Wavelength Division Multiplex) optical communications.

(2) Description of the Related Art

The optical communication network technology is a core technology for establishing the foundation of information communication networks. In view of growing demands in recent years for a wider range of more sophisticated information services, efforts are being made to promote the quick development of the optical communication network technology.

WDM, which is finding wide use in the field of recent optical communications, refers to a process of multiplexing different wavelengths of light to transmit a plurality of signals simultaneously over a single optical fiber.

WDM systems have a supervisory channel for supervising an optical signal, known as OSC (Optical Supervisory Channel). The supervisory channel is used to supervise WDM system nodes.

Problems of the conventional supervisory channel are that it is not flexible enough and suffers a lack of convenience because a fixed frequency is assigned to the supervisory channel between sections for WDM communications.

FIG. 10 of the accompanying drawings shows a conventional WDM system that is suffering problems. As shown in FIG. 10, a WDM terminal node 500 comprises optical transmission units 501, 502, a supervisory control unit 511, and a wavelength multiplexer 512.

The optical transmission unit 501 comprises an optical device 501a for emitting a main optical signal having a fixed wavelength $\lambda 1$, and the optical transmission unit 502 comprises an optical device 502a for emitting a main optical signal having a fixed wavelength $\lambda 2$. The optical transmission units 501, 502 are units that the user can install and replace as desired.

The supervisory control unit 511 emits an optical supervisory channel signal having a fixed wavelength $\lambda 3$. Alternatively, the supervisory control unit 511 may be installed in another node, and the WDM terminal node 500 may receive an optical supervisory channel signal having a fixed wavelength $\lambda 3$ from the supervisory control unit 511 installed in the other node. The wavelength multiplexer 512 multiplexes the optical signals emitted from the optical transmission units 501, 502 and the supervisory control unit 511 into a wavelength-multiplexed signal, and outputs the wavelength-multiplexed signal over a single optical fiber.

It is assumed that the user owns, in its inventory, only an optical transmission unit 503 comprising an optical device 503a for emitting a main optical signal having a fixed wavelength $\lambda 3$. When the optical transmission unit 502 becomes faulty, however, the user cannot use the optical transmission unit 503 from the inventory to replace the optical transmission unit 502 because the optical signal of the wavelength $\lambda 3$ has already been used by the supervisory control unit 511 or the optical supervisory channel signal of the fixed wavelength $\lambda 3$ is being received from the other node. Consequently, the conventional WDM system suffers a lack of convenience due to the assignment of the fixed wavelength to the optical supervisory channel signal.

In recent years, networks are becoming larger in size and more complex in structure. In such larger and more complex networks, the conventional band available for OSC transmission fails to transmit sufficient control information, resulting in a reduction in the system efficiency.

SUMMARY OF THE INVENTION

It is, therefore, an object of the present invention to provide a communication system for performing WDM optical communications efficiently with variably set supervisory control channels.

To achieve the above object, there is provided in accordance with the present invention a communication system for performing WDM optical communications. The communication system includes a WDM device for providing supervisory control channels for supervising optical communications, the supervisory control channels including a first optical supervisory channel whose transmission band falls outside of the transmission band for main optical signals, and a second supervisory channel whose transmission band falls in an idle band in the transmission band for the main optical signals, the WDM device including supervisory control channel setting means for variably setting the supervisory control channels and WDM transmitting means for wavelength-multiplexing and -demultiplexing the supervisory control channels and the main optical signals, and a network managing device including setting information indicating means for indicating setting information for setting the supervisory control channels to the WDM device, and operating state managing means for managing a network operating state.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
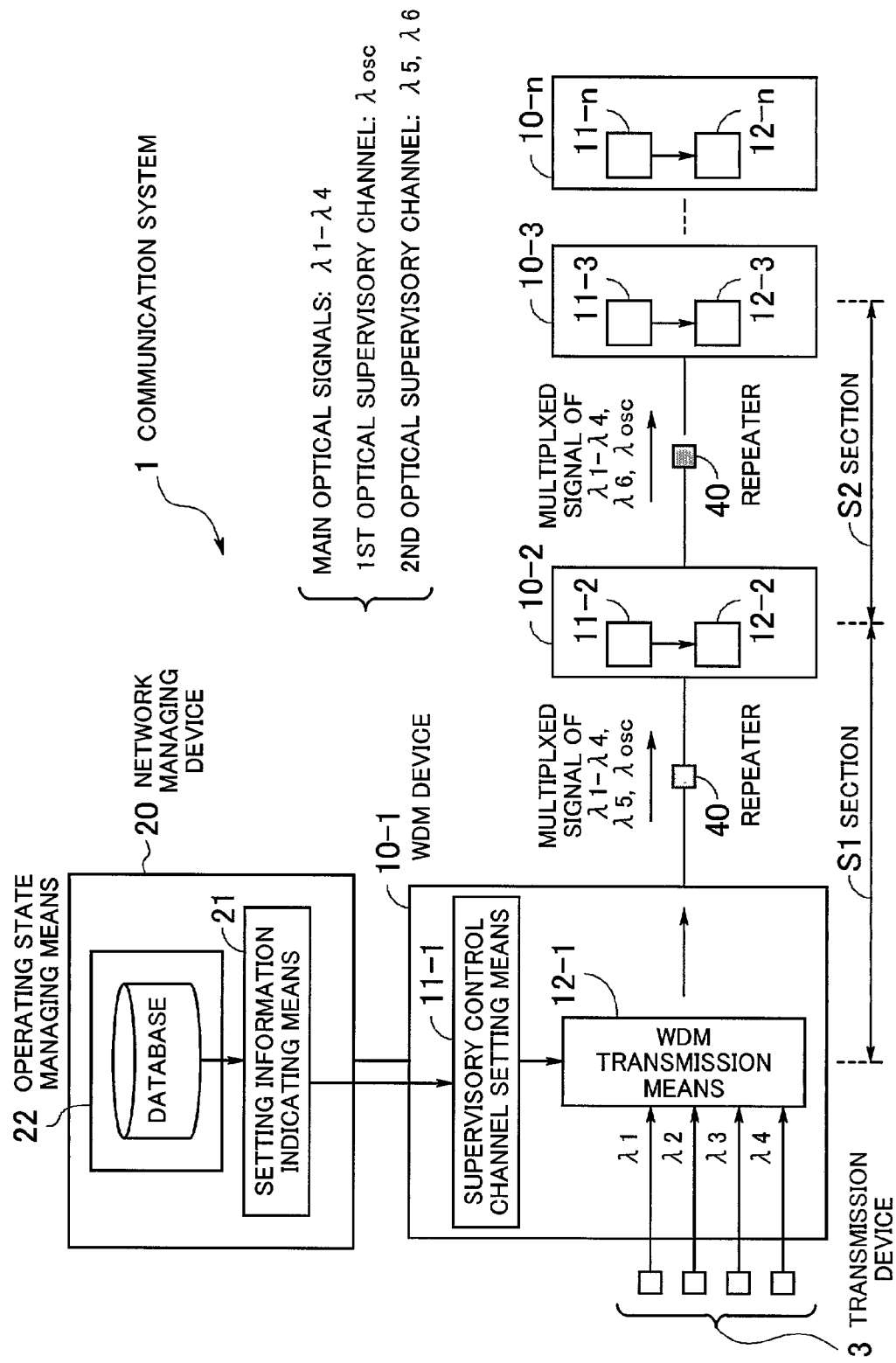
FIG. 1 is a diagram illustrative of the principles of a communication system according to the present invention.

FIG. 1 illustrates the principles of a communication system 1 according to the present invention. The communication system 1 comprises a plurality of WDM devices 10-1 through 10-n for performing bidirectional WDM communications between sections, a network managing device 20 for managing a network that is made up of the WDM devices 10-1 through 10-n and transmission devices connected to the WDM devices 10-1 through 10-n, and a plurality of repeaters 40 (described later on with reference to FIG. 8) connected to optical fiber cables between the WDM devices 10-1 through 10-n.

The WDM devices 10-1 through 10-n comprise respective supervisory control channel setting means 11-1 through 11-n and respective WDM transmission means 12-1 through 12-n. The WDM devices 10-1 through 10-n, the supervisory control channel setting means 11-1 through 11-n, and the WDM transmission means 12-1 through 12-n may also collectively be referred to as a WDM device 10, a supervisory control channel setting means 11, and a WDM transmission means 12, respectively.

The supervisory control channel setting means 11 variably sets, for each section, supervisory control channels, which include a first optical supervisory channel and a second optical supervisory channel, for effecting supervisory control on optical communications.

The first optical supervisory channel is an optical supervisory channel whose transmission band falls outside of the transmission band for main optical signals, and corresponds to the conventional OSC (Optical Supervisory Channel). The second optical supervisory channel is an optical supervisory channel whose transmission band falls in an idle band in the transmission band for main optical signals.

The WDM transmission means 12 performs a transmission control process for wavelength-multiplexing and -demultiplexing main optical signals that are transmitted as information signals from the transmission device connected to the WDM device or from an adjacent WDM device, and supervisory control channels as control signals.

The network managing device 20 has a setting information indicating means 21 for indicating setting information to set supervisory channels to the WDM device 10. The setting information includes, for example, wavelength information, section information, and time information.

The wavelength information comprises information indicative of a wavelength that is to be assigned to the second optical supervisory channel. The second optical supervisory channel to which a wavelength $\lambda a$ is assigned is referred to as an optical supervisory channel C. The section information comprises information indicative of a section for which the optical supervisory channel C is to be used. The time information comprises information for setting a time zone in which the optical supervisory channel C is to be used.

The network managing device 20 also has an operating state managing means 22 for managing an operating state of the overall network. The operating state managing means 22 is supplied with information representing the operating state periodically from the WDM device 10 to which the network managing device 20, and stores the supplied information in a database.

Operation of the communication system 1 shown in FIG. 1 will be described below. The first optical supervisory channel will hereinafter be referred to as an OSC, and the second optical supervisory channel as an optical supervisory channel. First, the setting information indicating means 21 transmits setting information representing that the wavelength to be used by the optical supervisory channel in a section SI between the WDM device 10-1 and the WDM device 10-2 is set to $\lambda 5$ and the wavelength to be used by the optical supervisory channel in a section S2 between the WDM device 10-2 and the WDM device 10-3 is set to $\lambda 6$, to the supervisory control channel setting means 11-1. These wavelengths $\lambda 5$, $\lambda 6$ belong to the idle band in the transmission band for main optical signals transmitted in the network.

The supervisory control channel setting means 11-1 transmits setting information representing that the wavelength to be used by the optical supervisory channel in the section S1 is set to $\lambda 5$ and the wavelength to be used by the optical supervisory channel in the section S2 is set to $\lambda 6$, via the WDM transmission means 12-1 to the WDM device 10-2, using the OSC that has heretofore been set as the supervisory channel. Similarly, the supervisory control channel setting means 11-2 transmits setting information representing that the wavelength to be used by the optical supervisory channel in the section S2 is set to $\lambda 6$, via the WDM transmission means 12-2 to the WDM device 10-3, using the OSC.

In operation, the WDM transmission means 12-1 multiplexes main optical signals having respective wavelengths $\lambda 1$ through $\lambda 4$, the optical supervisory channel having the wavelength $\lambda 5$ that is outputted from the supervisory control channel setting means 11-1, and a supervisory control channel as the OSC having a wavelength $\lambda osc$, into a multiplexed signal, and transmits the multiplexed signal to the WDM device 10-2.

The WDM transmission means 12-2 multiplexes the main optical signals having the respective wavelengths $\lambda 1$ through $\lambda 4$, the optical supervisory channel having the wavelength $\lambda 6$ that is outputted from the supervisory control channel setting means 11-2, and the supervisory control channel as the OSC having the wavelength $\lambda osc$, into a multiplexed signal, and transmits the multiplexed signal to the WDM device 10-3.

As described above, the communication system 1 employs the idle band in the transmission band for the main optical signals as the transmission band for the optical supervisory channel to chiefly transmit operation control information, and settings of the optical supervisory channel, e.g., wavelength settings, are variably changed between the sections. The settings that are variably changed are indicated to the WDM devices using the existing OSC.

Since the transmission bandwidth is increased by the supervisory control channels that include the existing OSC and the newly added optical supervisory channels, the communication system 1 can transmit more control information than the conventional communication system, can be used in extended networks with sufficient control information, and has its efficiency increased in extended network environments. The communication system 1 may use only the OSC for initializing the operation control process and may use both the OSC and the optical supervisory channel for the transmission of operational control information.

In addition, the communication system 1 can have its operational flexibility increased because the optical supervisory channels between the sections of the WDM devices 10 can variably be set.

Figure 2:
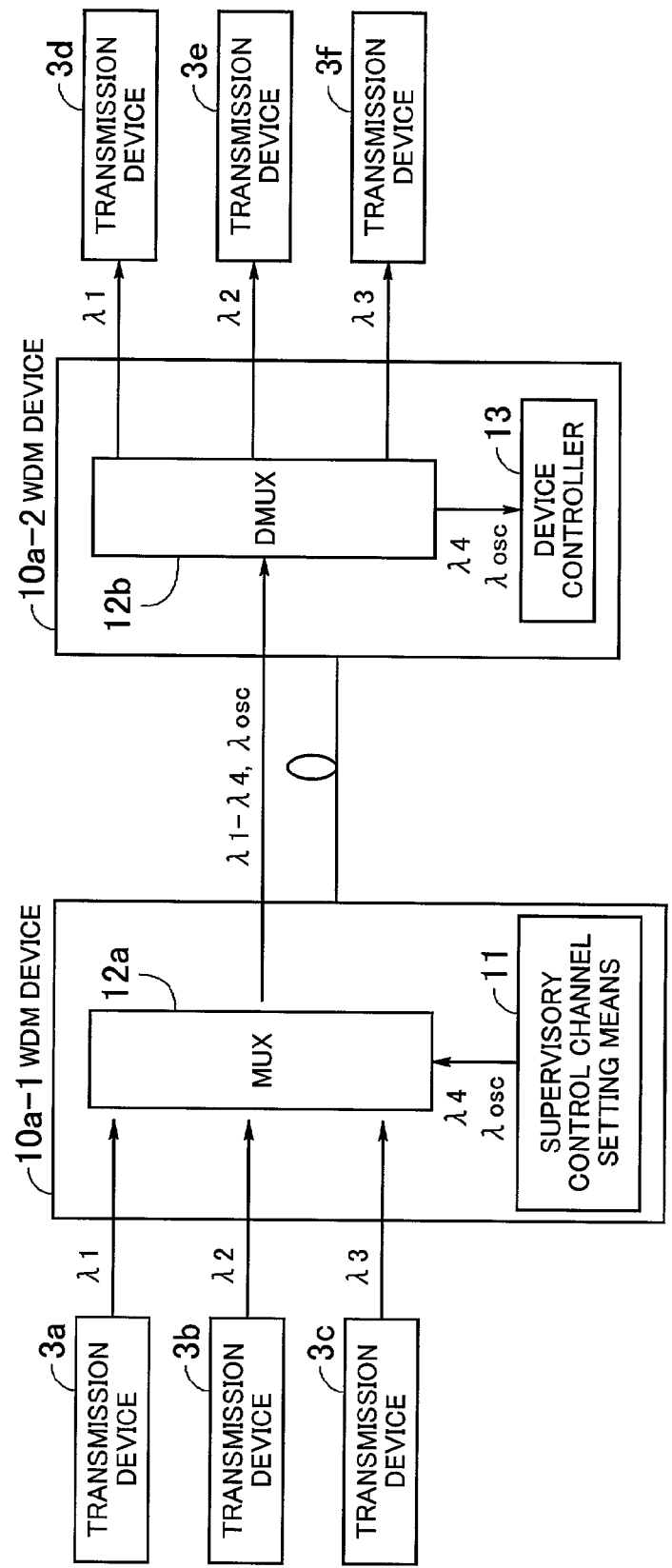
FIG. 2 is a block diagram of an integrated-type WDM device.

Two specific arrangements of the WDM device 10 will be described below. These two specific device forms include an integrated-type WDM device and a transponder-type WDM device. FIG. 2 shows in block form the integrated-type WDM device. An integrated-type WDM device receives and multiplexes main optical signals to which wavelengths for WDM are assigned.

As shown in FIG. 2, WDM devices 10a-1, 10a-2 are connected to each other by an optical fiber. To the WDM devices 10a-1, 10a-2, there are connected respective sets of transmission devices 3a, 3b, 3c and 3d, 3e, 3f for processing signals of the SONET transmission interface, for example.

The transmission devices 3a, 3b, 3c emit optical signals for WDM to which respective wavelengths λ1, λ2, λ3 are allocated. The WDM device 10a-1 has a supervisory control channel setting means 11 for emitting an optical supervisory channel having a wavelength λ4 and a supervisory control channel having a wavelength λosc, and a multiplexer (MUX) 12a, which corresponds to the MUX function of the WDM transmission means 12, for multiplexing main optical signals having respective wavelengths λ1, λ2, λ3 and supervisory control channels having respective wavelengths λ4, λosc into a multiplexed signal and transmitting the multiplexed signal to the WDM device 10a-2 over an optical fiber.

The WDM device 10a-2 has a demultiplexer (DMUX) 12b, which corresponds to the DMUX function of the WDM transmission means 12, for receiving and demultiplexing the transmitted multiplexed signal into the main optical signals having the respective wavelengths λ1, λ2, λ3 and the supervisory control channels having the respective wavelengths λ4, λosc, and transmitting the main optical signals to the transmission devices 3d, 3e, 3f and the supervisory control channels to a device controller 13. Based on the supervisory control channels, the device controller 13 performs an internal control process to initialize the WDM device 10a-2 and set circuit links.

Figure 3:
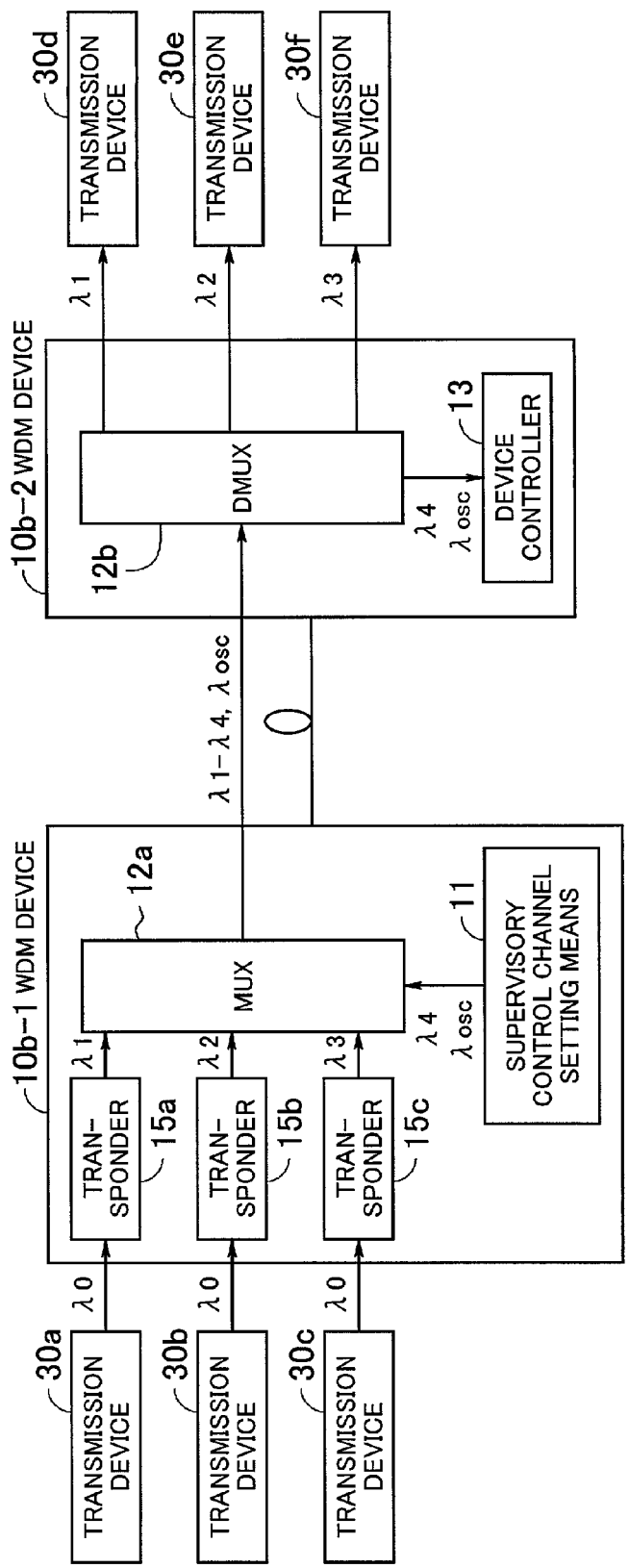
FIG. 3 is a block diagram of a transponder-type WDM device.
Figure 10:
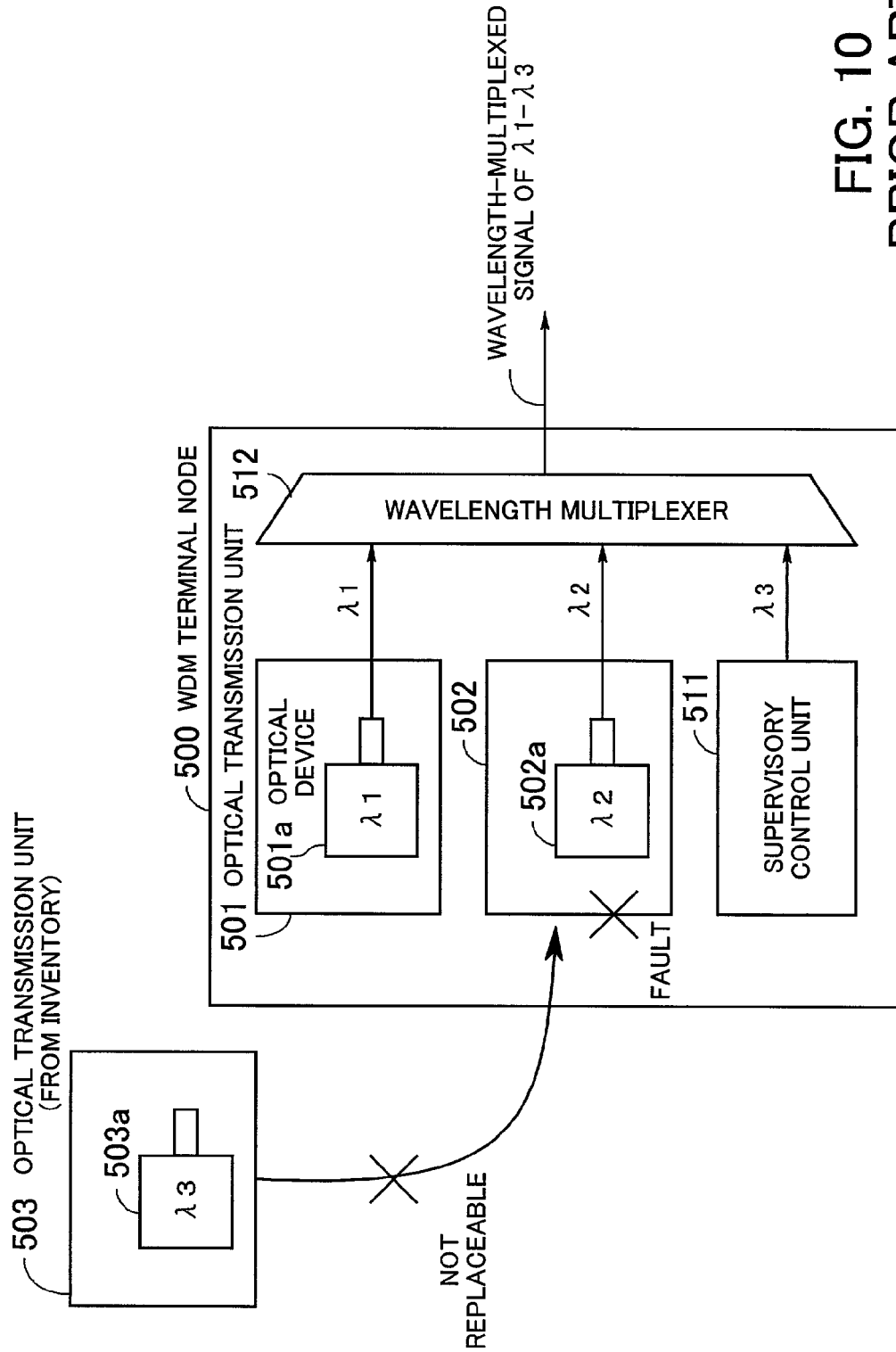
FIG. 10 is a block diagram of a conventional WDM system that is suffering problems.

FIG. 3 shows in block form the transponder-type WDM device. A transponder-type WDM device has transponders, which correspond to the optical transmission units shown in FIG. 10, for assigning wavelengths for WDM to main optical signals that are supplied from external circuits thereby to multiplex the main optical signals.

As shown in FIG. 3, WDM devices 10b-1, 10b-2 are connected to each other by an optical fiber. To the WDM devices 10b-1, 10b-2, there are connected respective sets of transmission devices 30a, 30b, 30c and 30d, 30e, 30f for processing signals of the SONET transmission interface, for example.

The transmission devices 30a, 30b, 30c generate TDM (Time-Division-Multiplexed) main optical signals, respectively, to which one wavelength λ0 is assigned. The WDM device 10b-1 has a supervisory control channel setting means 11 for emitting an optical supervisory channel having a wavelength λ4 and a supervisory control channel having a wavelength λosc, and a plurality of transponders 15a, 15b, 15c.

The transponder 15a converts the main optical signal having the wavelength λ0 which has been transmitted from the transmission device 30a into a main optical signal having a wavelength λ1 for WDM. The transponder 15b converts the main optical signal having the wavelength λ0 which has been transmitted from the transmission device 30b into a main optical signal having a wavelength λ2 for WDM. The transponder 15c converts the main optical signal having the wavelength λ0 which has been transmitted from the transmission device 30c into a main optical signal having a wavelength λ3 for WDM.

The WDM device 10b-1 also has a multiplexer 12a for multiplexing the main optical signals having the respective wavelengths λ1, λ2, λ3 and the supervisory control channels having the respective wavelengths λ4, λosc into a multiplexed signal and transmitting the multiplexed signal to the WDM device 10b-2 over an optical fiber.

The WDM device 10b-2 has a demultiplexer 12b for receiving and demultiplexing the transmitted multiplexed signal into the main optical signals having the respective wavelengths λ1, λ2, λ3 and the supervisory control channels having the respective wavelengths λ4, λosc, and transmitting the main optical signals to the transmission devices 30d, 30e, 30f and the supervisory control channels to a device controller 13. Based on the supervisory control channels, the device controller 13 performs an internal control process to initialize the WDM device 10b2 and set circuit links.

Figure 4:
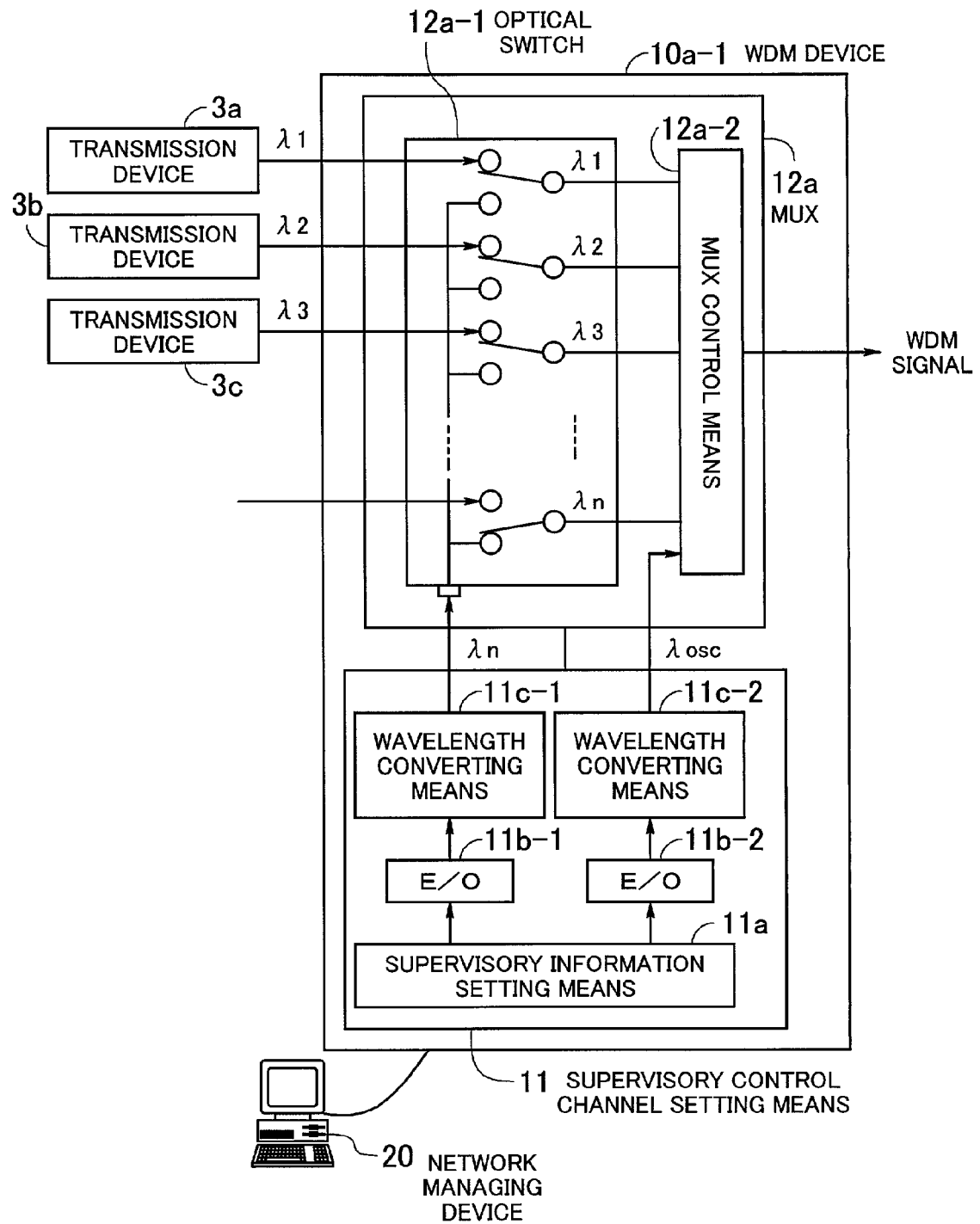
FIG. 4 is a block diagram showing an internal structure of a WDM device.

Internal structures and operation of the WDM devices 10a-1, 10b-1 will be described in detail below. FIG. 4 shows in block form the internal structure of the WDM device 10a-1. As shown in FIG. 4, the MUX 12a comprises an optical switch 12a-1 and a MUX control means 12a-2, and the supervisory control channel setting means 11 comprises a supervisory information setting means 11a, electro-optical (E/O) converters 11b-1, 11b-2, and wavelength converting means 11c-1, 11c-2.

The network managing device 20 indicates a wavelength λn in the idle band in the transmission band for the main optical signals as a wavelength to be used by an optical supervisory channel, to the WDM device 10a-1. The supervisory information setting means 11a transmits supervisory control information, which includes an operating state of the WDM device 10a-1 to be transmitted via the optical supervisory channel, e.g., cross-connect information relative to Add/Drop for upstream and downstream stations, and fault information, to the electro-optical converter 11b-1 that converts the supplied information into an optical signal. The supervisory information setting means 11a also transmits supervisory control information, which includes setting information to be transmitted via OSC and other information representing the number of wavelengths of WDM, a bit rate, the number of WDM devices, etc., to the electro-optical converter 11b-2 that converts the supplied information into an optical signal.

The wavelength converting means 11c-1 converts the optical signal from the electro-optical converter 11b-1 into an optical signal having a wavelength λn, and transmits the optical signal having the wavelength λn to the optical switch 12a-1. The wavelength converting means 11c-2 converts the optical signal from the electro-optical converter 11b-2 into an optical signal having a wavelength λosc, and transmits the optical signal having the wavelength λosc to the MUX control means 12a-2.

The optical switch 12a-1 performs a switching action for transmitting the main optical signals having the respective wavelengths λ1, λ2, λ3 supplied from the transmission devices 3a, 3b, 3c and the optical supervisory channel having the wavelength λn supplied from the supervisory control channel setting means 11, to input ports of the MUX control means 12a-2. Switching settings of the optical switch 12a-1 are given from the supervisory information setting means 11a.

The input ports of the MUX control means 12a-2 are assigned to the respective wavelengths because the input ports comprise respective waveguides dedicated to particular wavelengths. The optical switch 12a-1 selectively applies the main optical signals and the optical supervisory channel which have been received to the respective input ports of the MUX control means 12a-2.

The MUX control means 12a-2 multiplexes the main optical signals having the respective wavelengths λ1, λ2, λ3 and the optical supervisory channels having the respective wavelengths λn, λosc into a WDM signal, and transmits the WDM signal over an optical fiber.

Figure 5:
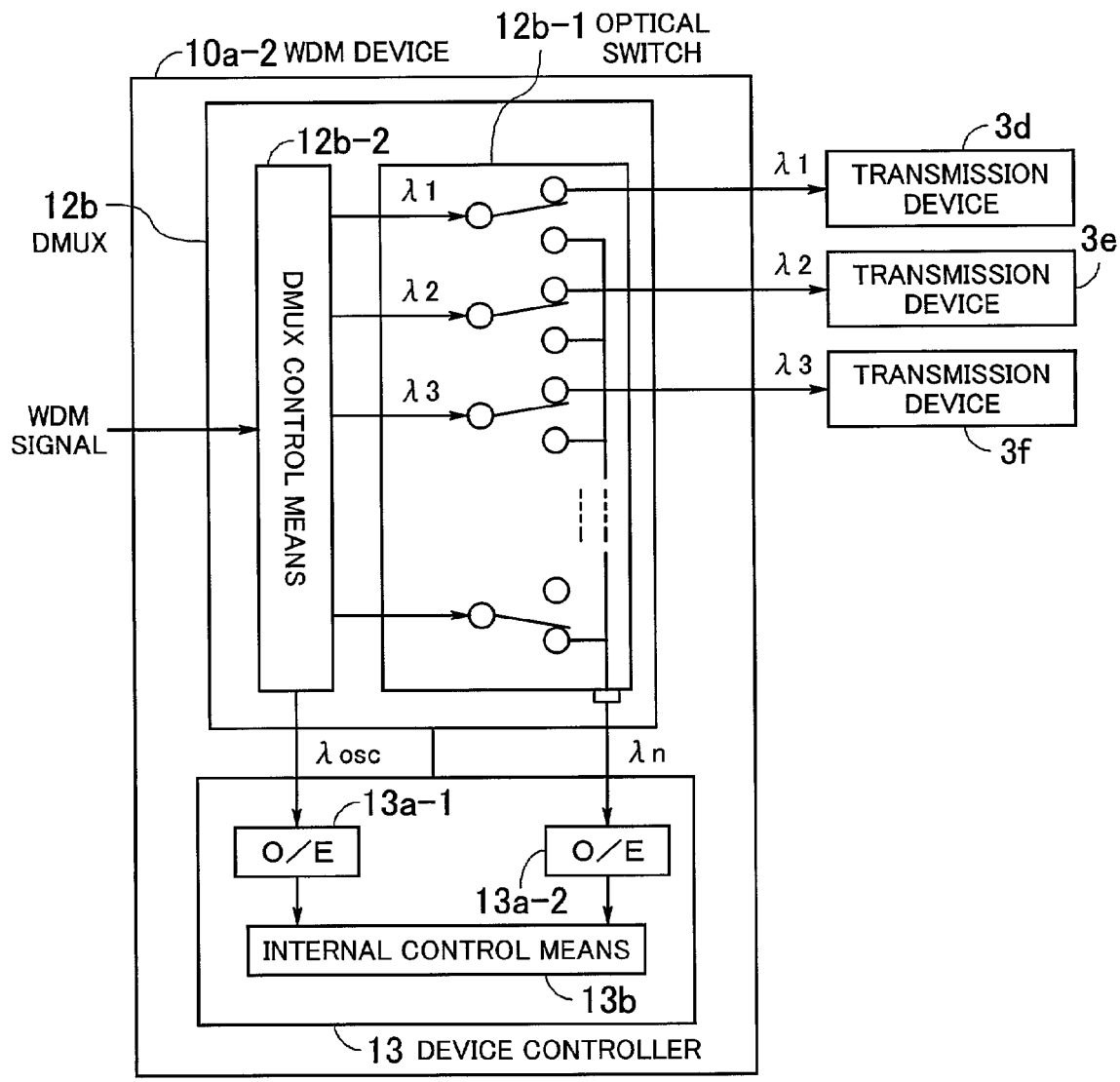
FIG. 5 is a block diagram showing an internal structure of a WDM device.

FIG. 5 shows in block form the internal structure of the WDM device 10a-2. As shown in FIG. 5, the DMUX 12b comprises an optical switch 12b-1 and a DMUX control means 12b-2, and the device controller 13 comprises optoelectric (O/E) converters 13a-1, 13a-2 and an internal control means 13b.

The DMUX control means 12b-2 demultiplexes the WDM signal transmitted from the WDM device 10a-1 into the main optical signals and the optical supervisory channels, and outputs the main optical signals to the optical switch 12b-1 and the optical supervisory channel having the wavelength λosc to the device controller 13. The optical switch 12b-1 performs a switching action for transmitting the main optical signals having the respective wavelengths λ1, λ2, λ3 to the transmission devices 3d, 3e, 3f and the optical supervisory channel having the wavelength λn to the device controller 13.

The opto-electric converters 13a-1, 13a-2 convert the optical supervisory channel OSC having the wavelength λosc and the optical supervisory channel having the wavelength λn into respective electric signals, and supply the electric signals to the internal control means 13b. Based on the supplied electric signals, the internal control means 13b performs an internal control process on the WDM device 10a-2. Switching settings of the optical switch 12b-1 and setting information of the optical supervisory channels are indicated in advance to the WDM device 10a-2 using the OSC.

Modifications of the MUX 12a and the DMUX 12b will be described below. In each of the MUX 12a and the DMUX 12b described above, the optical signal system effects a switching control process for WDM control. According to the modifications, however, an electric signal system effects a switching control process for WDM control.

Figure 6:
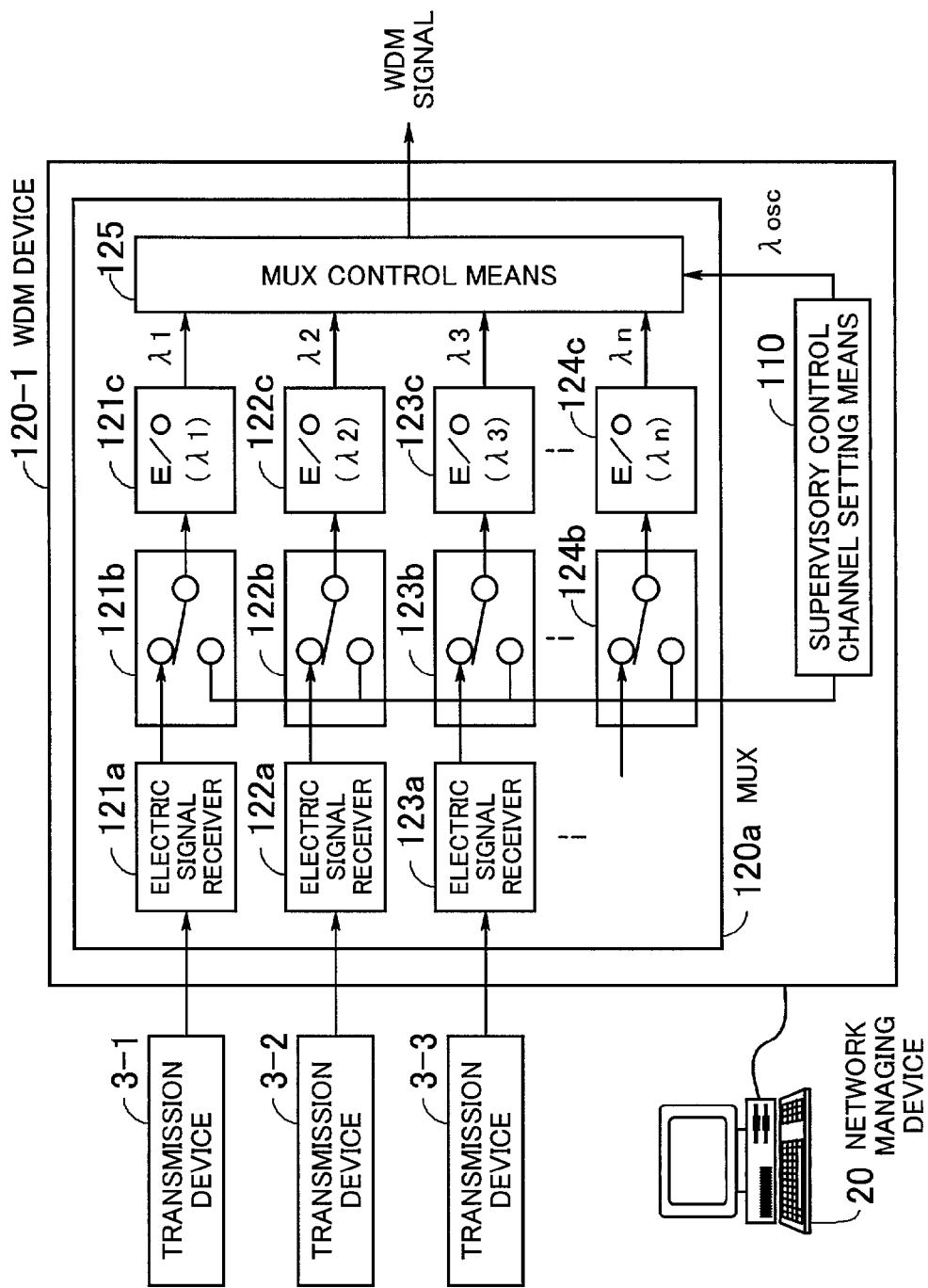
FIG. 6 is a block diagram showing an internal structure of a WDM device according to a modification.
Figure 7:
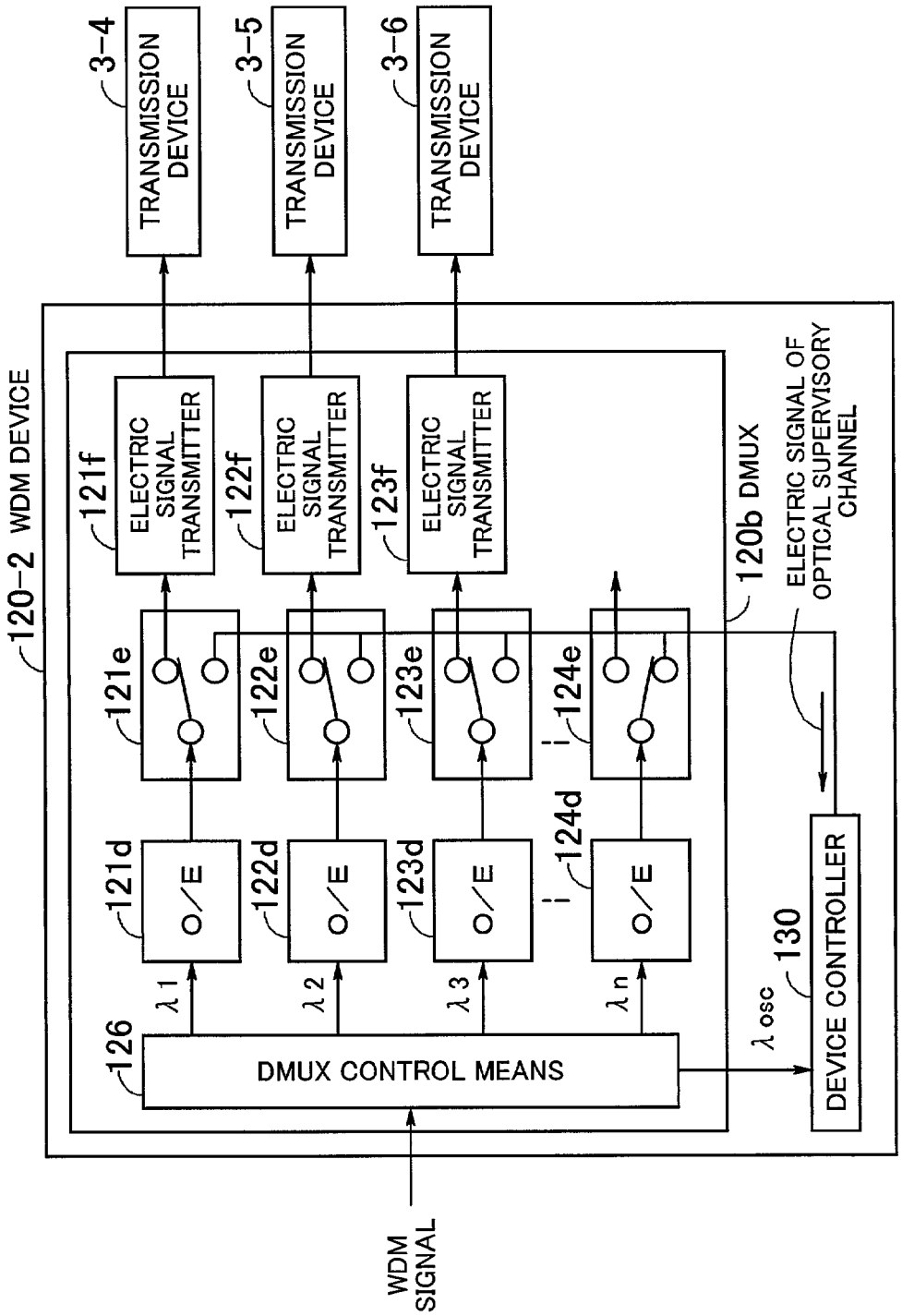
FIG. 7 is a block diagram showing an internal structure of a WDM device according to another modification.

FIGS. 6 and 7 show internal structures of the WDM devices according to the respective modifications.

In FIG. 6, a WDM device 120-1 has a MUX 120a including electric signal receivers 121a, 122a, 123a, switches 121b, 122b, 123b, 124b, electro-optical converters 121c, 122c, 123c, 124c, and a MUX control means 125.

The network managing device 20 indicates a wavelength λn in the idle band in the transmission band for the main optical signals as a wavelength to be used by an optical supervisory channel, to the WDM device 120-1. The WDM device 120-1 also has a supervisory control channel setting means 110 which transmits supervisory control information to be transmitted via an optical supervisory channel to the switches 121b, 122b, 123b, 124b in the MUX 120a and also transmits control information to be transmitted via OSC to the MUX control means 125.

The electric signal receivers 121a, 122a, 123a receive respective electric signals transmitted as information signals from transmission devices 3-1, 3-2, 3-3. The switches 121b, 122b, 123b, 124b receive output signals from the electric signal receivers 121a, 122a, 123a and an electric signal representing the optical supervisory channel transmitted from the supervisory control channel setting means 110, and perform a switching action to selectively send the supplied signals to the electro-optical converters 121c, 122c, 123c, 124c. Switching settings of the switches 121b, 122b, 123b, 124b are given from the supervisory control channel setting means 110.

The electro-optical converters 121c, 122c, 123c, 124c convert the supplied electric signals into corresponding optical signals which have preassigned wavelengths, and transmit the optical signals to the MUX control means 125. The MUX control means 125 multiplexes the main optical signals having the respective wavelengths λ1, λ2, λ3 and the optical supervisory channels having the respective wavelengths λn, λosc into a WDM signal, and transmits the WDM signal over an optical fiber.

In FIG. 7, a WDM device 120-2 has a DMUX 120b including a DMUX control means 126, opto-electric converters 121d, 122d, 123d, 124d, switches 121e, 122e, 123e, 124e, and electric signal transmitters 121f, 122f, 123f.

The DMUX control means 126 receives and demultiplexes a supplied WDM signal, outputs main optical signal and an optical supervisory channel to opto-electric converters 121d, 122d, 123d, 124d, and also output an OSC to a device controller 130. The opto-electric converters 121d, 122d, 123d, 124d convert the supplied signals into optical signals, and output the optical signals to the switches 121e, 122e, 123e, 124e. The switches 121e, 122e, 123e, 124e effects a switching action to supply the main optical signals to the electric signal transmitters 121f, 122f, 123f and the optical supervisory channel to the device controller 130.

The electric signal transmitters 121f, 122f, 123f transmit the main optical signals to respective transmission devices 3-4, 3-5, 3-6. Based on the OSC and the optical supervisory channel that have been supplied, the device controller 130 performs an internal control process. Switching settings of the switches 121e, 122e, 123e, 124e and setting information of the optical supervisory channels are indicated in advance to the WDM device 120-2 using the OSC.

Figure 8:
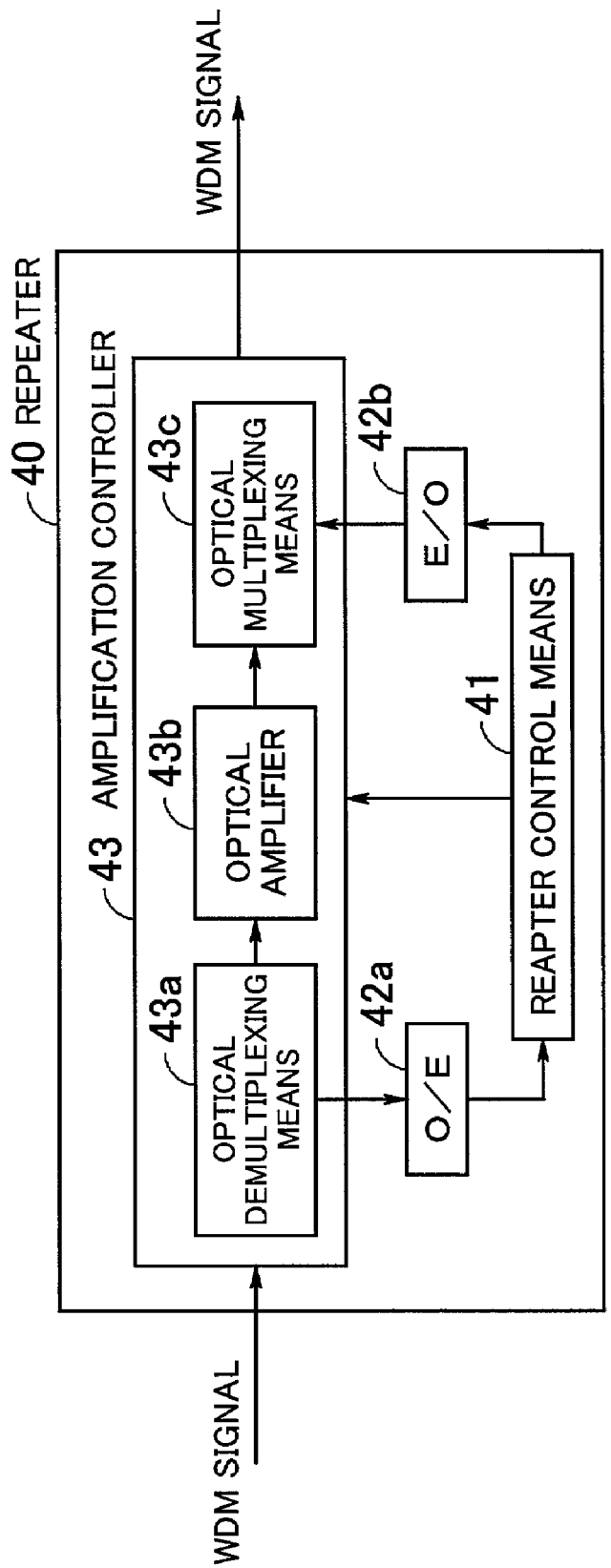
FIG. 8 is a block diagram showing a structure of a repeater.

The repeaters 40 shown in FIG. 1 will be described below. FIG. 8 shows in block form a structure of each of the repeaters 40. The repeater 40 controls an internal repeater amplifier based on the information of a received OSC, inserts its own state information into an OSC to be transmitted, multiplexes the OSC and main optical signals, and transmits a multiplexed signal.

The repeater 40 comprises a repeater control means 41, an opto-electric (O/E) converter 42a, an electro-optical (E/O) converter 42b, and an amplification controller 43. The amplification controller 43 comprises an optical demultiplexing means 43a, an optical amplifier 43b, and an optical multiplexing means 43c.

The optical demultiplexing means 43a demultiplexes a WDM signal, which comprises main optical signals, an OSC, and an optical supervisory channel that have been multiplexed, transmits the main optical signals and the optical supervisory channel to the optical amplifier 43b, and transmits the OSC to opto-electric converter 42a.

The opto-electric converter 42a converts the OSC into an electric signal. The repeater control means 41 controls an amplification process of the optical amplifier 43b in the amplification controller 43 based on the information of the OSC that has been converted into the electric signal. The repeater control means 41 also adds an operating state of the repeater 40 to the information of the OSC, and transmits it to the electro-optical converter 42b.

The electro-optical converter 42b converts the newly generated OSC into an optical signal, and transmits the optical signal to the optical multiplexing means 43c. The optical multiplexing means 43c multiplexes the main optical signals and the optical supervisory channel that have been amplified by the optical amplifier 43b and the OSC transmitted from the electro-optical converter 42b into a WDM signal, and transmits the WDM signal.

Figure 9:
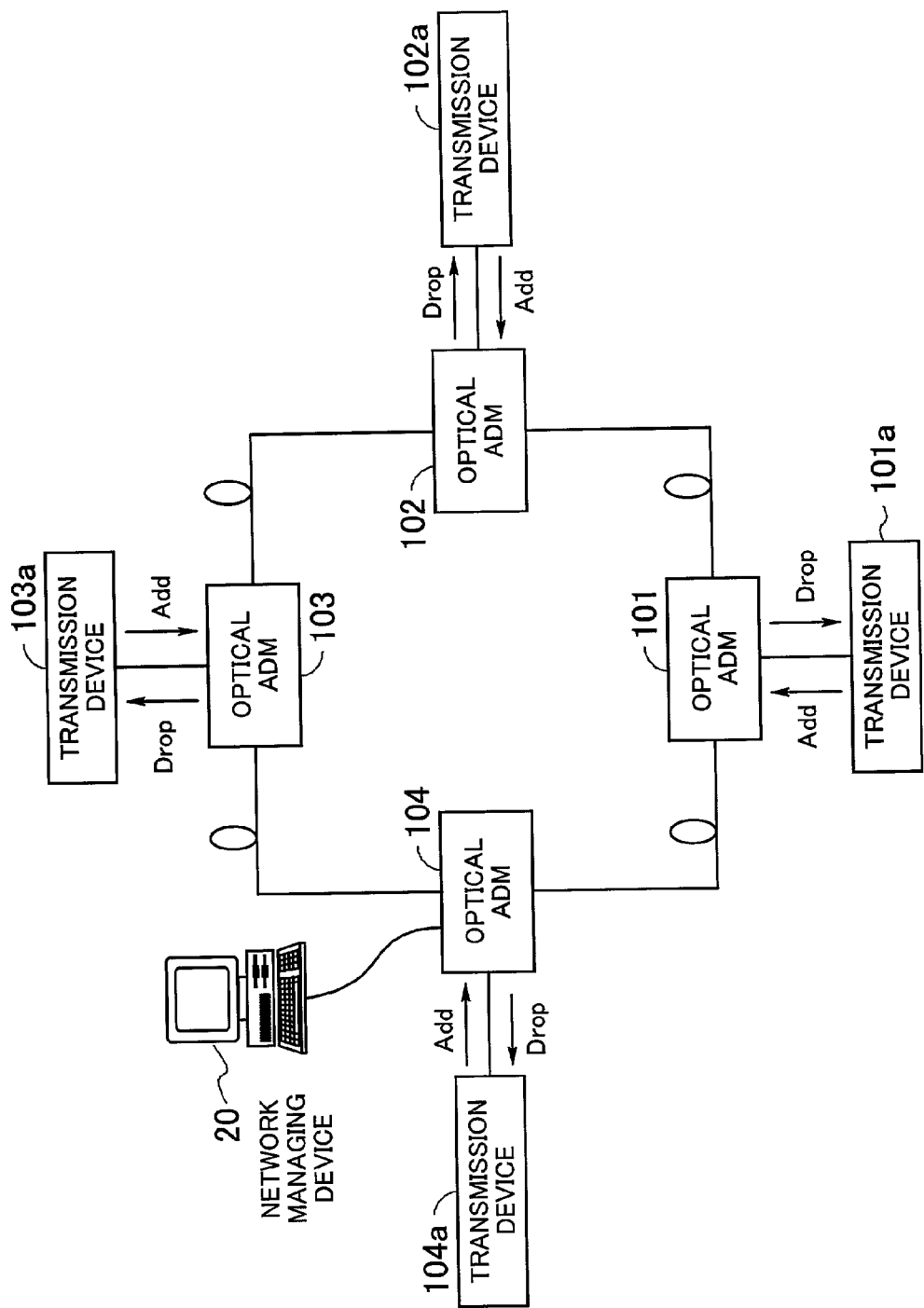
FIG. 9 is a block diagram of a ring network constructed of optical ADMs.

A ring network including optical ADMs (Add Drop Multiplexers) which incorporates the principles of the present invention will be described below. FIG. 9 shows in block form such a ring network including optical ADMs.

As shown in FIG. 9, optical ADMs 101, 102, 103, 104 are interconnected by optical fibers, making up a ring network, and a network managing device 20 is connected to the optical ADM 104. Transmission devices 101a, 102a, 103a, 104a are connected respectively to the optical ADMs 101, 102, 103, 104.

The optical ADMs 101, 102, 103, 104 receive and multiplex signals transmitted from the transmission devices 101a, 102a, 103a, 104a (Add). The optical ADMs 101, 102, 103, 104 also demultiplex a multiplexed signal and transmit desired signals to the transmission devices 101a, 102a, 103a, 104a (Drop).

The WDM device 10 according to the present invention is incorporated in each of the optical ADMs 101, 102, 103, 104 of the ring network. A multiplexed signal composed of main optical signals and supervisory control channels is transmitted between the optical ADMs 101, 102, 103, 104. Optical supervisory channels to which desired wavelengths have been assigned are also transmitted between the optical ADMs 101, 102, 103, 104. The network managing device 20 sets supervisory channels for the optical ADMs 101, 102, 103, 104 and manages an operating state of the network.

As described above, in the communication system 1 according to the present invention, the WDM device 10 variably sets supervisory control channels for WDM transmission, and the network managing device 20 indicates setting information of the supervisory control channels and manages an operating state of the network.

With such an arrangement, since the communication system is capable of adaptively setting supervisory control channels, the communication system is highly flexible and performs WDM communications efficiently.

In the above description, the wavelength of the OSC which is the first optical supervisory channel is set to the fixed wavelength λosc. However, the wavelength of the OSC may easily be made variable when it is controlled in the same manner as with the second optical supervisory channel.

In the communication system according to the present invention, as described above, the WDM device variably sets supervisory control channels that include a first optical supervisory channel whose transmission band falls outside of the transmission band for main optical signals and a second supervisory channel whose transmission band falls in an idle band in the transmission band for main optical signals, and the network managing device indicates setting information of the supervisory control channels and manages an operating state of the network. Inasmuch as the communication system is capable of adaptively setting supervisory control channels, the communication system is highly flexible and performs WDM communications efficiently.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

The invention claimed is:

1. A communication system for performing optical communications, comprising:
   (a) a WDM device for providing supervisory control channels for supervising optical communications, said supervisory control channels including a first optical supervisory channel whose transmission band falls outside of the transmission band for main optical signals, and a second supervisory channel whose transmission band falls in the transmission band for said main optical signals, said WDM device comprising:
      WDM transmitting means for wavelength-multiplexing and -demultiplexing said supervisory control channels and said main optical signals,
      incoming wavelength selection means coupled to an input side of said WDM transmitting means for selecting a first wavelength to receive an incoming signal of the second supervisory channel,
      outgoing wavelength selection means coupled to an output side of said WDM transmitting means for selecting a second wavelength to transmit an outgoing signal of the second supervisory channel, and
      supervisory control channel setting means for variably setting the second supervisory control channel according to given setting information, including independent selection of the first and second wavelengths for the incoming and outgoing signals of the second supervisory channel; and
   (b) a network managing device comprising:
      setting information indicating means for indicating the setting information for setting said supervisory control channels to said WDM device, the setting information including wavelength information that specifies which idle-band wavelength to select for use as the second optical supervisory channel at the supervisory control channel setting means, and
      operating state managing means for managing a network operating state.

2. The communication system according to claim 1, wherein said setting information further includes:
   section information setting a section for which said second optical supervisory channel is to be used, and
   time information setting a time zone in which said second optical supervisory channel is to be used.

3. The communication system according to claim 1, wherein said supervisory control channel setting means comprises means for using said first optical supervisory channel for indicating said setting information between WDM devices and using at least one of said first optical supervisory channel and said second optical supervisory channel for transmitting operation control information.

4. The communication system according to claim 1, wherein said WDM transmitting means comprises means for performing a switching control process with an optical signal system or an electric signal system and wavelength-multiplexing and -demultiplexing said main optical signals and said supervisory control channels.

5. The communication system according to claim 1, further comprising:
   a repeater controlling an amplification process of an internal repeater amplifier based on information of the supervisory control channels, multiplexing supervisory control channels with its own state information and said main optical signals, and transmitting a multiplexed signal.

6. A WDM device for performing WDM optical communications, comprising:
   WDM transmitting means for wavelength-multiplexing and -demultiplexing said supervisory control channels and said main optical signals;
   incoming wavelength selection means coupled to an input side of said WDM transmitting means for selecting a first wavelength to receive an incoming signal of the second supervisory channel;
   outgoing wavelength selection means coupled to an output side of said WDM transmitting means for selecting a second wavelength to transmit an outgoing signal of the second supervisory channel; and supervisory control channel setting means for providing supervisory control channels for supervising optical communications, said supervisory control channels including a first optical supervisory channel whose transmission band falls outside of the transmission band for main optical signals, and a second supervisory channel whose transmission band falls in the transmission band for said main optical signals, and variably setting the second supervisory control channel including independent selection of the first and second wavelengths for the incoming and outgoing signals of the second supervisory channel according to wavelength information provided from an external source.

7. A network managing device for managing a network, comprising:
setting information indicating means for indicating, to a WDM device, setting information for setting supervisory control channels for supervising optical communications, said supervisory control channels including a first optical supervisory channel whose transmission band falls outside of the transmission band for main optical signals, and a second supervisory channel whose transmission band falls in the transmission band for said main optical signals, the setting information including wavelength information that commands said WDM device to select a first wavelength for receiving an incoming signal of the second supervisory channel, as well as to select a second wavelength, independently of said selection of the second wavelength, for transmitting an outgoing signal of the second supervisory channel; and
operating state managing means for managing a network operating state.

8. A communication system for performing optical communications, comprising:
a WDM device comprising supervisory control channel setting means for variably setting supervisory control channels including selection of an idle-band wavelength for a second supervisory channel, and a network managing device including setting information indicating means for setting supervisory control channels to said WDM device, the setting information including wavelength information that specifies which idle-band wavelength to select for use as the second optical supervisory channel at the supervisory control channel setting means.

9. The communication system according to claim 8, wherein said supervisory control channel setting means comprises means for using a first optical supervisory channel for indicating said setting information between WDM devices and using said first optical supervisory channel and said second optical supervisory channel for transmitting operation control information.

10. A method of optical communications, comprising:
providing supervisory control channels supervising optical communications including a first optical supervisory channel whose transmission band falls outside of the transmission band of main optical signals, and a second supervisory channel whose transmission band falls in an idle band in the transmission band of said main optical signals,
variably setting the supervisory control channels and selecting an idle-band wavelength for the second supervisory channel;
wavelength-multiplexing and -demultiplexing the supervisory control channels and the main optical signals;
indicating setting information setting the supervisory control channels and specifying which idle-band wavelength to select as the second optical supervisory channel, and managing a network operating state.

11. The method according to claim 10, using said first optical supervisory channel to indicate setting information between WDM devices and using the first optical supervisory channel and the second optical supervisory channel to transmit operation control information.

* * * * *